United States Patent
Ou-Yang et al.

(10) Patent No.: US 6,891,696 B1
(45) Date of Patent: May 10, 2005

(54) AERODYNAMIC BASE DESIGN FOR TMR REDUCTION

(75) Inventors: Jin Hui Ou-Yang, San Jose, CA (US); Jonathan M. Garbarino, San Jose, CA (US); Lin Yang, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 272 days.

(21) Appl. No.: 10/137,228

(22) Filed: Apr. 30, 2002

(51) Int. Cl.[7] ............................................. G11B 17/02
(52) U.S. Cl. ................................................... 360/97.02
(58) Field of Search ......................... 360/97.02, 97.03; 369/75.1

(56) References Cited

U.S. PATENT DOCUMENTS

| | | | | |
|---|---|---|---|---|
| 5,541,791 A | * | 7/1996 | Yamasaki et al. | 360/256.1 |
| 5,898,545 A | * | 4/1999 | Schirle | 360/254.7 |
| 5,956,203 A | * | 9/1999 | Schirle et al. | 360/97.03 |
| 6,097,568 A | * | 8/2000 | Ekhoff | 360/97.02 |
| 6,208,484 B1 | * | 3/2001 | Voights | 360/97.02 |
| 6,542,328 B2 | * | 4/2003 | Harrison et al. | 360/97.03 |
| 6,600,626 B2 | * | 7/2003 | Shimizu et al. | 360/97.03 |

* cited by examiner

*Primary Examiner*—Brian E. Miller
(74) *Attorney, Agent, or Firm*—Milad G. Shara, Esq.; Knobbe, Martens, Olson & Bear

(57) ABSTRACT

A disk drive includes an enclosure having a cover and a base, a spindle motor assembly, a disk, and an arcuate raised portion on the base. The disk is mounted on a hub of the spindle motor assembly and has a first surface and a second surface. The first surface is proximate the base and is spaced apart from the base by a first clearance distance. The arcuate raised portion on the base is spaced apart from the disk by a second clearance distance. The second clearance distance is less than the first clearance distance. At least a portion of the disk is superposed over the arcuate raised portion.

24 Claims, 9 Drawing Sheets

AERODYNAMIC BASE DESIGN FOR TMR REDUCTION

BACKGROUND OF THE INVENTION

1. Field of the Invention

This application relates to a disk drive. More particularly, this application relates to a base design that reduces vibration of the disks in the disk drive to improve track-following performance of the disk drive.

2. Description of the Related Art

A disk drive includes at least one disk with a magnetic medium deposited on at least one surface of the disk between an inner circumference and an outer circumference. The disk is mounted on and rotated by a spindle motor assembly, which includes a spindle motor bearing. The disk drive also includes a data transfer head that writes data onto the magnetic medium in concentric, generally circular tracks, and that reads data from the tracks written onto the magnetic medium. In most applications, the data transfer head is extended out over the magnetic medium by an actuator assembly that moves the head in an arcuate path with respect to the surface of the disk that has the magnetic medium. The actuator assembly usually includes an actuator arm and a head-gimbal assembly (HGA), which includes the data transfer head. The tracks on the disk are divided into sectors, which are presented to the data transfer head by the rotation of the disk. Each of the foregoing disk drive components at least partially is housed within an enclosure that usually includes a base and a cover.

The data transfer head is positioned over a selected track by a servo-system. The servo system includes servo data that is written onto the tracks. The data transfer head reads the servo data and generates a signal that indicates how close the head is to the center of a track based on the servo data. When the head is over the center of the track and follows it, the head is said to be track-following. When the head wanders from the centerline of the track, there is said to be track misregistration, or "TMR." It is generally desirable to minimize TMR such that the disk drive is better able to perform data transfer.

One factor that tends to increase TMR is disk flutter, which has a number of known sources. For example, airflow generated by the rotation of the disk within the enclosure proximate the disk induces disk flutter. Increased TMR is not desirable because increased TMR limits track-to-track spacing (i.e., track pitch) and consequently limits areal density.

SUMMARY OF THE INVENTION

In an aspect of the preferred embodiments, the present invention comprises a disk drive that includes an enclosure, a spindle motor assembly, and a disk. The enclosure includes a cover and a base. The disk drive also includes an arcuate raised portion on the base. The spindle motor assembly is mounted on the enclosure and includes a hub that is rotatable with respect to the enclosure. The disk is mounted on the hub and has a first surface and a second surface. The first surface is proximate the base and is spaced apart from the base by a first clearance distance. The arcuate raised portion on the base is spaced apart from the disk by a second clearance distance. The second clearance distance is less than the first clearance distance. At least a portion of the disk is superposed over the arcuate raised portion.

In another aspect of the preferred embodiments, the present invention comprises a disk drive that includes an enclosure, a spindle motor assembly, a disk, and an airflow constrictor. The enclosure includes a cover and a base. The spindle motor assembly is mounted on the enclosure and includes a hub that is rotatable with respect to the enclosure. The disk is mounted on the hub and has a first surface, a second surface, an inner circumferential portion, and an outer circumferential portion. The base and the first surface of the disk define a first airflow chamber. The second surface of the disk defines a boundary of a second airflow chamber. The airflow constrictor includes a first arcuate portion and a second portion. The first arcuate portion is generally parallel to the hub and is spaced radially outwardly therefrom. The second portion is generally perpendicular to the first arcuate portion and extends radially inwardly from the first arcuate portion of the airflow constrictor. The second portion of the airflow constrictor is subjacent only a portion of the outer circumferential portion of the disk. The airflow constrictor limits airflow between the first airflow chamber and the second airflow chamber.

In another aspect of the preferred embodiments, the present invention is a disk drive that includes an enclosure, a spindle motor assembly, a disk, and an airflow constrictor. The enclosure includes a cover and a base. The spindle motor assembly is mounted on the enclosure and includes a hub that is rotatable with respect to the enclosure. The disk is mounted on the hub and includes a first surface and a second surface. The base and the first surface of the disk define a first airflow chamber that has a first airflow chamber inlet. The second surface of the disk defines a boundary of a second airflow chamber that has a second airflow chamber inlet. The airflow constrictor is located at least partially in the first airflow chamber inlet. The airflow constrictor limits airflow between the first airflow chamber and the second airflow chamber.

In another aspect of the preferred embodiments, the present invention is a disk drive that includes an enclosure that has a cover and a base. The base includes an actuator arm movement area and a disk assembly mounting area. The actuator arm movement area includes a first level that has a first elevation. The disk assembly mounting area has a second level that extends around a portion of the disk assembly mounting area. The second level has a second elevation. The disk drive also includes a spindle motor assembly, a disk assembly, a first clearance distance, and a second clearance distance. The spindle motor assembly is mounted on the enclosure and includes a hub that is rotatable with respect to the enclosure. The disk assembly includes a disk. The disk assembly is mounted on the hub in the disk assembly mounting area. The first clearance distance is defined between the first surface of the disk and the first level of the base. The second clearance distance is defined between the first surface of the disk and the second level of the disk assembly mounting area of the base. The second clearance distance is less than the first clearance distance.

BRIEF DESCRIPTION OF THE DRAWINGS

The accompanying drawings are included to provide a further understanding of the present invention and are incorporated in and constitute a part of this specification. The drawings illustrate preferred embodiments of the present invention and together with the description serve to explain the principles of the invention.

DETAILED DESCRIPTION OF THE PREFERRED EMBODIMENT

Figure 1:
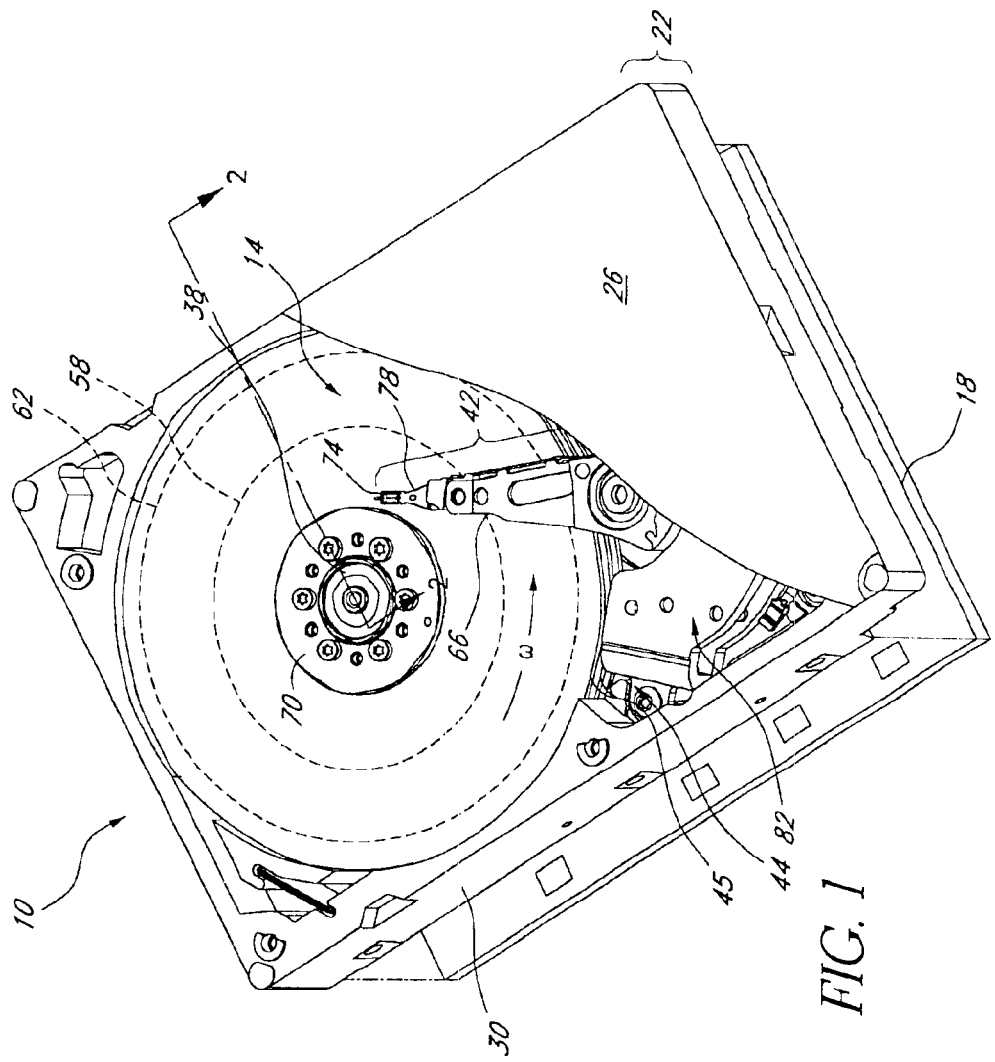
FIG. 1 is a perspective view of a disk drive including a cover, one embodiment of a base, and a printed circuit board removed, the cover partially broken away to illustrate internal components.
Figure 2:
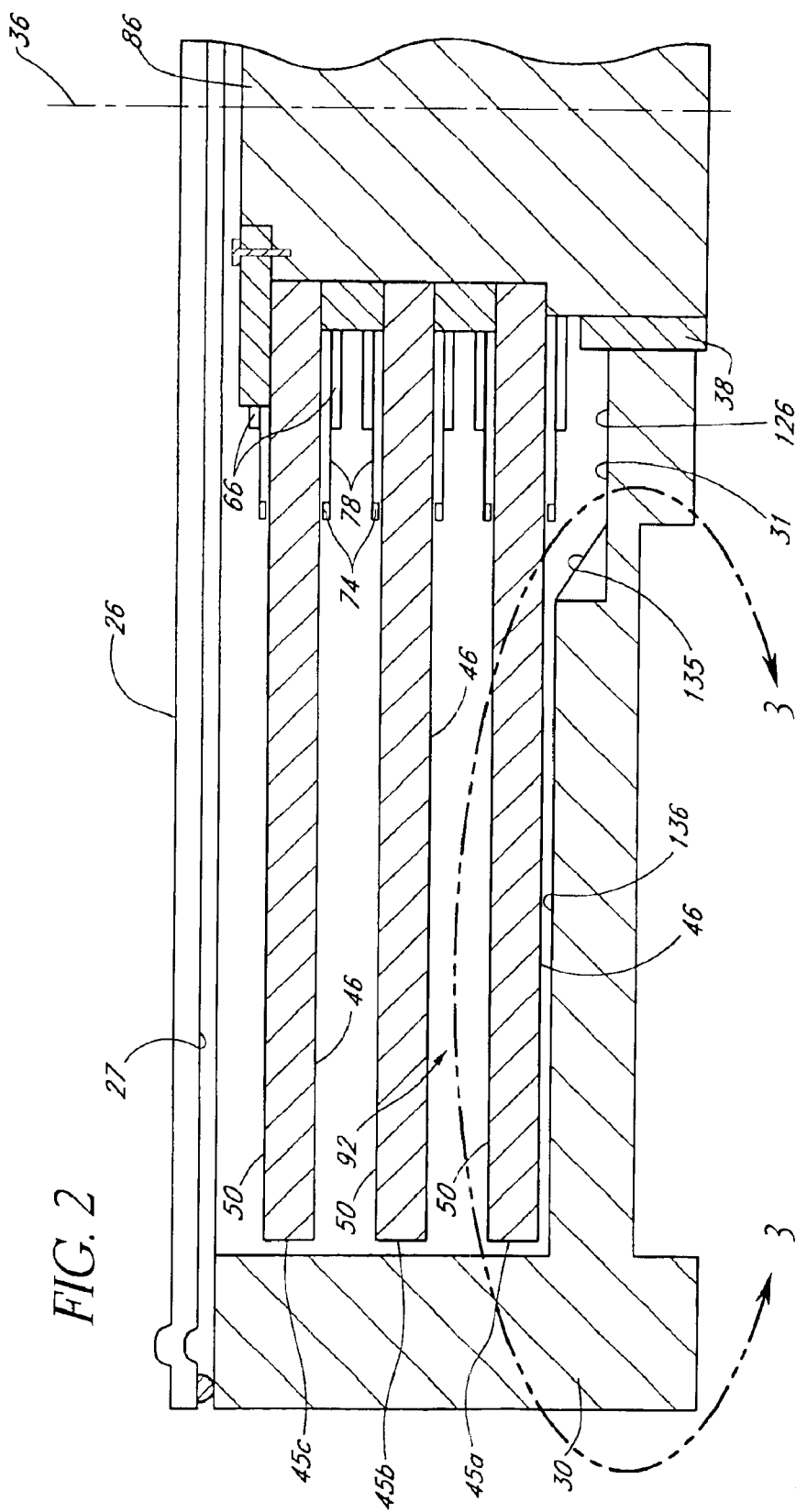
FIG. 2 is a cross-section view of the disk drive of FIG. 1 taken along section line 2—2.

FIG. 1 is a perspective view of a disk drive 10. The disk drive 10 includes a head-disk assembly (HDA) 14 and a printed circuit board 18. The HDA 14 comprises an enclosure 22 that includes a cover 26 and a base 30. As shown in FIG. 2, the cover 26 has an inner surface 27 that faces the internal components of the disk drive 10 when the disk drive 10 is assembled, and the base 30 has an inner surface 31 that faces the internal components of the disk drive 10 when the disk drive 10 is assembled. The elevation of the inner surface 31 of the base 30 varies in a variety of ways for different embodiments of the invention disclosed herein, as described in more detail below.

The printed circuit board 18 of the disk drive 10 is connectable to the base 30, but is shown removed therefrom in FIG. 1 for illustration. The HDA 14 also includes a spindle motor assembly 38, a head-stack assembly (HSA) 42, and a disk assembly 44 that includes at least one disk 45. In the illustrated embodiment, the disk drive 10 includes three disks 45. More particularly, the disk assembly 44 includes a first disk 45a mounted closest to the printed circuit board, a third disk 45c is mounted closest to the cover 26, and a second disk 45b is mounted between the first disk 45a and the second disk 45c. The disks 45 are rotatable within the enclosure 22 about an axis 36. Each disk 45 is mounted on the spindle motor assembly 38. One skilled in the art will recognize that the disk drive 10 claimed herein includes more or fewer disks 45 in other embodiments.

Each of the disks 45 has a respective first surface 46 and a respective second surface 50, with each of the surfaces 46, 50 having a magnetic medium deposited thereon. Magnetic transitions representing data are written onto and read from the magnetic medium in a known manner. In one embodiment, the first surface 46 is the surface of each disk 45 that faces the base 30. In one embodiment, the second surface 50 is the surface of each disk 45 that faces the cover 26. The first surface 46 of each disk 45 has an inner circumferential portion 58 and an outer circumferential portion 62. The outer circumferential portions 62 of the disks 45 are located proximate the outer edges of the disks 45. The inner circumferential portions 58 of the disks 45 are located between the respective outer circumferential portions 62 of the disks 45 and the respective inner edges of the disks 45. In one embodiment, the inner circumferential portions 58 of the disk surfaces are directly adjacent the inner edges of the disks 45, but in alternative embodiments, the inner circumferential portions 58 need not be directly adjacent to the inner edges of the disks 45.

The HSA 42 includes a plurality of actuator arms 66. Each actuator arm 66 positions a head gimbal assembly 70, which usually includes a data transfer head 74 and a suspension assembly 78. One end of the suspension assembly 78 of each head-gimbal assembly 70 is mounted on the respective actuator arm 66. Each data transfer head 74 is mounted near the opposite end of the respective suspension assembly 78. The actuator arms 66 position the data transfer heads 74 proximate the first surface 46 and the second surface 50 of the disks 45 in the disk drive 10. Each data transfer head 74 includes, in one embodiment, a read element and a write element and thus operates in a read/write system. One skilled in the art will recognize that the invention claimed below could also be used to reduce TMR in a read-only application as well. A rotary actuator 82 positions the actuator arms 66 under the control of a conventional servo system.

The spindle motor assembly 38 includes a rotatable hub 86 to which the disks 45 are mounted (See FIG. 2). The spindle motor assembly 38 is electrically connected to circuitry located on the printed circuit board 18, e.g., to a spindle motor controller. The spindle motor controller controls the rotation of the hub 86 of the spindle motor assembly 38 and the disks 45 attached thereto. When the disk drive 10 is operating, the disks 45 are rotated at a substantially constant angular velocity (o, in the direction indicated in FIG. 1. Of course, one skilled in the art will recognize that the invention described herein can be carried out in a disk drive that has a spindle motor that rotates in a direction of rotation opposite of that shown in FIG. 1.

Figure 3:
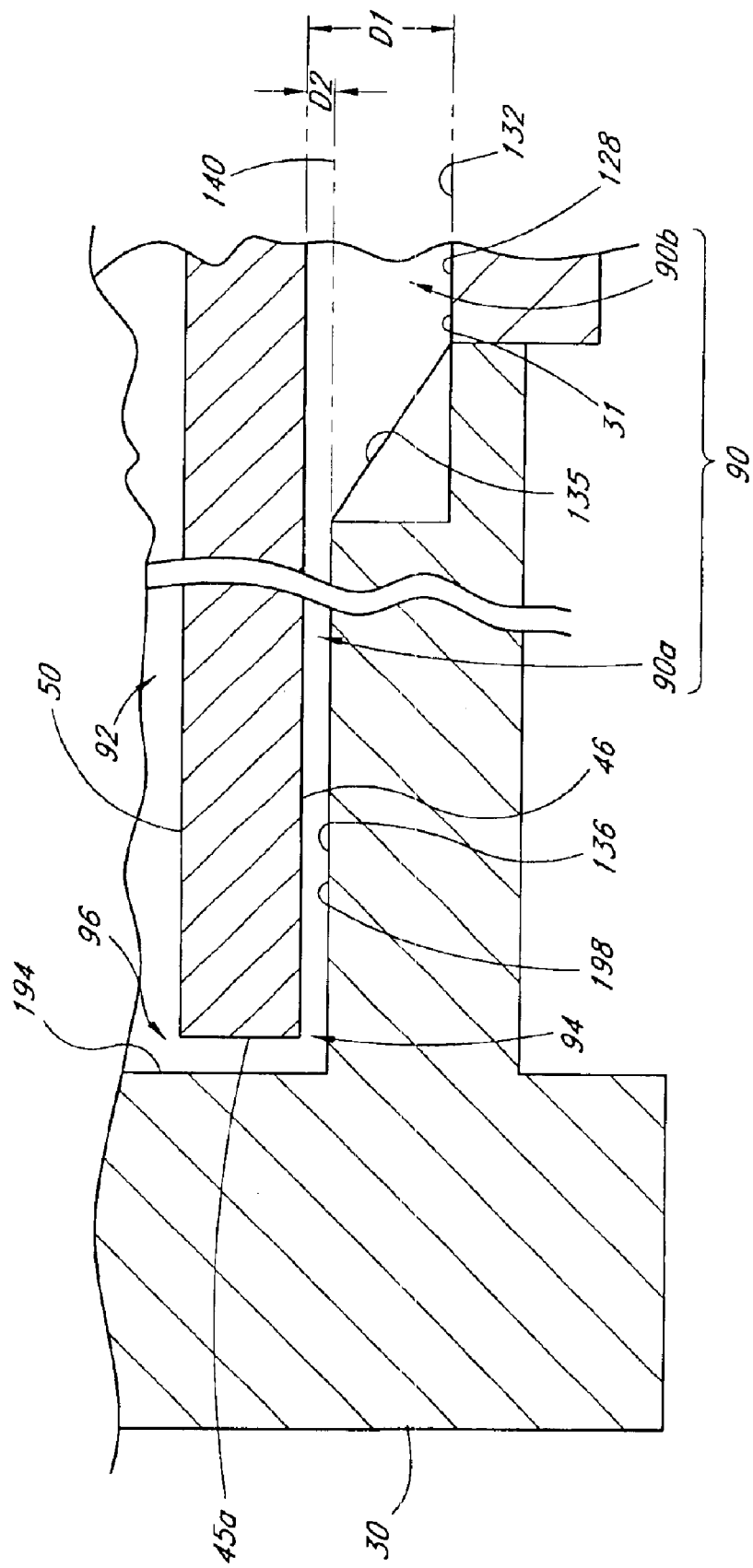
FIG. 3 is an enlarged cross-sectional view of FIG. 2 taken along section line 3—3.

The rotation of the disks 45 generates airflow within the enclosure 22. In particular, airflow is generated in a first airflow chamber 90 that includes a first portion 90a and a second portion 90b. The airflow is also generated in a second airflow chamber 92. The first airflow chamber 90 is at least partially defined by the inner surface 31 of the base 30 and the first surface 46 of the first disk 45a. In one embodiment, a first airflow chamber inlet 94 is provided between the first airflow chamber 90 and the second airflow chamber 92. In one embodiment, a second airflow chamber inlet 96 also is provided between the first airflow chamber 90 and the second airflow chamber 92. FIG. 3 illustrates that in one embodiment, the first portion 90a of the first airflow chamber 90 is located proximate the outer edge of the disk 45a. FIG. 3 illustrates that in one embodiment, the second portion 90b of the first airflow chamber 90 is located between the first portion 90a of the first airflow chamber 90 and the spindle motor 38. FIG. 3 also illustrates that the second surface 50 of the first disk 45a forms a boundary of the second airflow chamber 92. The airflow chamber 92 is further defined by the first surface 46 of the disk 45b in one embodiment. In another embodiment, the second airflow chamber 92 is further defined by the inside surface 27 of the cover 26.

The airflow in the airflow chambers 90, 92 generally follows the rotation of the disks 45. Turbulent airflow in the airflow chambers 90, 92 and turbulent airflow between the chambers 90, 92 causes disk flutter of the disks 45. In particular, in a disk drive without the present invention, the disk 45a would experience a relatively large amount of disk flutter due to turbulent airflow between the airflow chamber 90 and the airflow chamber 92. This disk flutter increases the TMR of the disk drive 10. As discussed above, this is undesirable because higher TMR limits the track pitch, and consequently limits the areal density. As discussed below, the embodiments of the present invention reduce the disk flutter and thus reduce the TMR caused by disk flutter.

Figure 4:
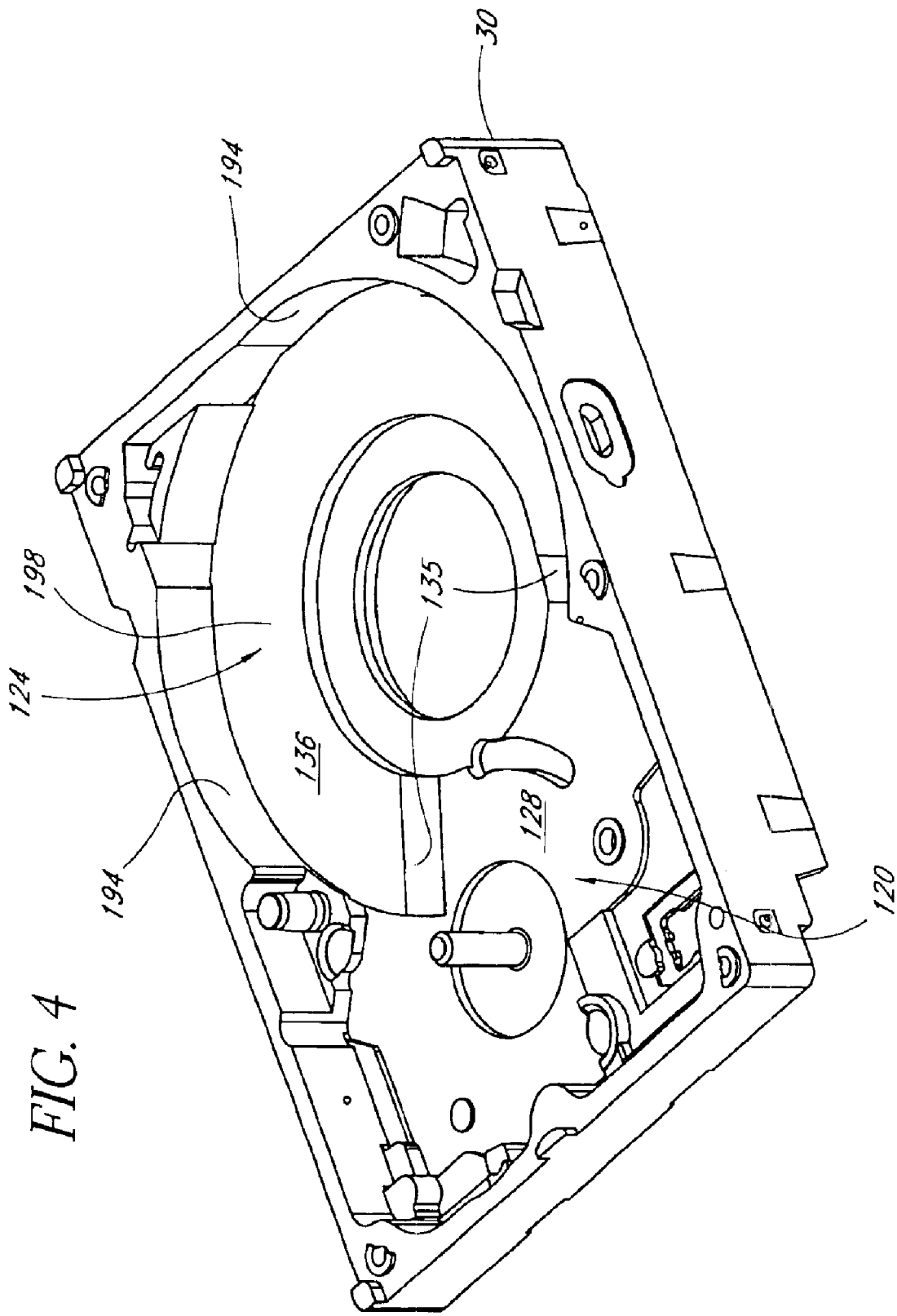
FIG. 4 is a perspective view of the base of the disk drive of FIGS. 1–3.

FIGS. 2–4 show one embodiment of a base 30 that reduces disk flutter induced by the airflow within the airflow chambers 90, 92 and between the airflow chambers 90, 92. FIG. 4 is a perspective view of the base 30, which includes a arcuate portion that is raised to a second elevation, i.e., an arcuate raised portion. The base 30 includes an actuator arm movement area 120 and a disk assembly mounting area 124. The actuator arm movement area 120 has a first level 128 at a first elevation 132. (See FIG. 3.) The actuator arm movement area 120 is the portion of the base 30 over which the actuator arms 66 move when the rotary actuator 82 positions the HSA 42. The first elevation 132 of the first level 128 is selected to provide sufficient clearance between the actuator arm movement area 120 of the base 30 and the actuator arm 66 that is located between the base 30 and the first surface 46 of the disk 45a. As discussed in more detail below, in one embodiment, a first clearance distance D1 is defined between the first surface 46 of the disk 45a and the inner surface 31 of the base 30. More particularly, the first clearance distance D1 is defined between the first surface 46 of the disk 45a and the elevation 132 of the first level 128 of the base 30.

The disk assembly mounting area 124 has a first transition portion 135 to a second level 136 (referred to as an arcuate raised portion). The second level 136 extends around a portion of the disk assembly mounting area 124 to a second transition portion 135. The second level 136 has a second elevation 140 (FIG. 3). The second elevation 140 is selected to reduce the disk flutter of the disks 45 that is induced by airflow within the enclosure 22. A second clearance distance D2 is defined between the first surface 46 of the disk 45 and the second level 136 of the base 30. As shown in FIG. 3, the second clearance distance D2 is less than the first clearance distance D1. In one embodiment, the second clearance distance D2 is less than about 0.05 inches. In another embodiment, the second clearance distance D2 is between about 0.005 inches and about 0.025 inches. In another embodiment, the second clearance distance D2 is about 0.16 inches. In another embodiment, the second clearance distance D2 is about 0.1 inches.

In one embodiment, the transition portions 135 extend from the second level 136 to the first level 128. The transition portions 135 are configured to move airflow in a generally laminar fashion onto or off of the second level 136 of the base 30. In one embodiment, the transition portions 135 have a linear side profile. Each transition portion 135 preferably forms about a fifteen degree angle with a plane defined by the first level 128 of the base 30.

Figure 4A:
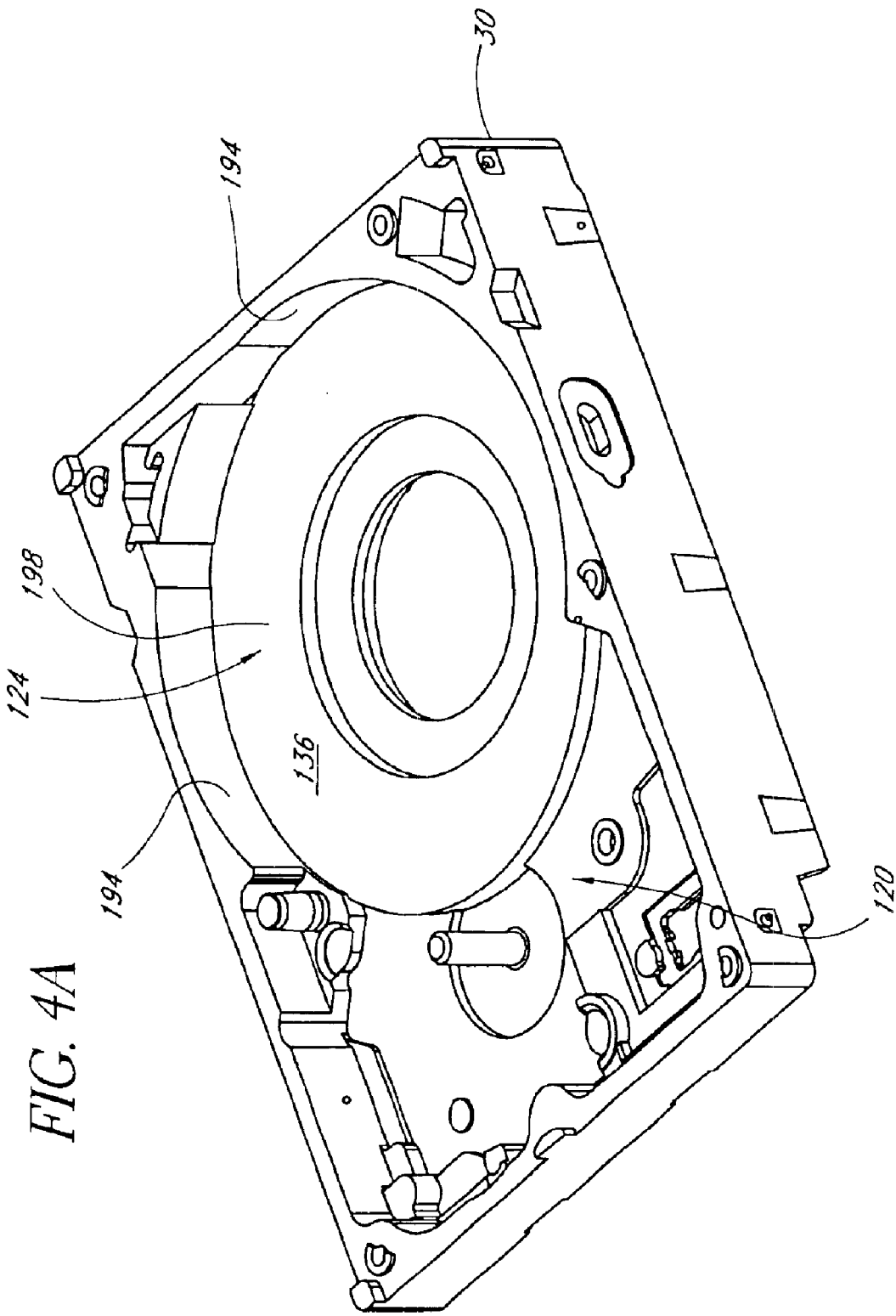
FIG. 4A is a perspective view of another embodiment of the base of the disk drive of FIGS. 1–3.

In one embodiment, the arcuate raised portion 136 is arranged around the perimeter of the disk assembly mounting area 124 where it subtends a central angle between about 210 degrees and about 270 degrees. In another embodiment, the arcuate raised portion 136 is arranged around the perimeter of the disk assembly mounting area 124 where it subtends a central angle of about 270 degrees. In another embodiment, illustrated in FIG. 4A, the arcuate raised portion 136 is arranged around the majority of the perimeter of the disk assembly mounting area 124 where it subtends a central angle of about 360 degrees. The transition portion 135 preferably extends between the arcuate raised portion 136 and the first level 128 of the actuator arm movement area 120 for embodiments where the arcuate raised portion 136 subtends a central angle of less than 360 degrees.

In general, where the base 30 includes an arcuate raised portion 136, at least a portion of the disk 45 is superposed over at least a portion of the arcuate raised portion. In one embodiment, the second clearance distance D2 is defined between the first surface 46 of the disk 45a and the arcuate raised portion 136, and the second clearance distance D2 is generally constant between the inner circumferential portion 62 of the disk 45 and the outer circumferential portion 58 of the disk 45, as in FIG. 4.

In one embodiment, a base 144 is provided that has the disk assembly mounting area 124 also has a third level 141, which can be considered as a lowered portion of the second level 136. See FIG. 5. The third level 141 has a third elevation 152. The third elevation 152 is generally between the first elevation 132 and the second elevation 140. More particularly, the third elevation 152 is selected so that the third level 141 is farther from the disk 45a than is the second level 136. The third level 148 can make the base 30 easier to manufacture since the tolerance required for the third level 141 need not be as precise as that of the second level 136.

Figure 5:
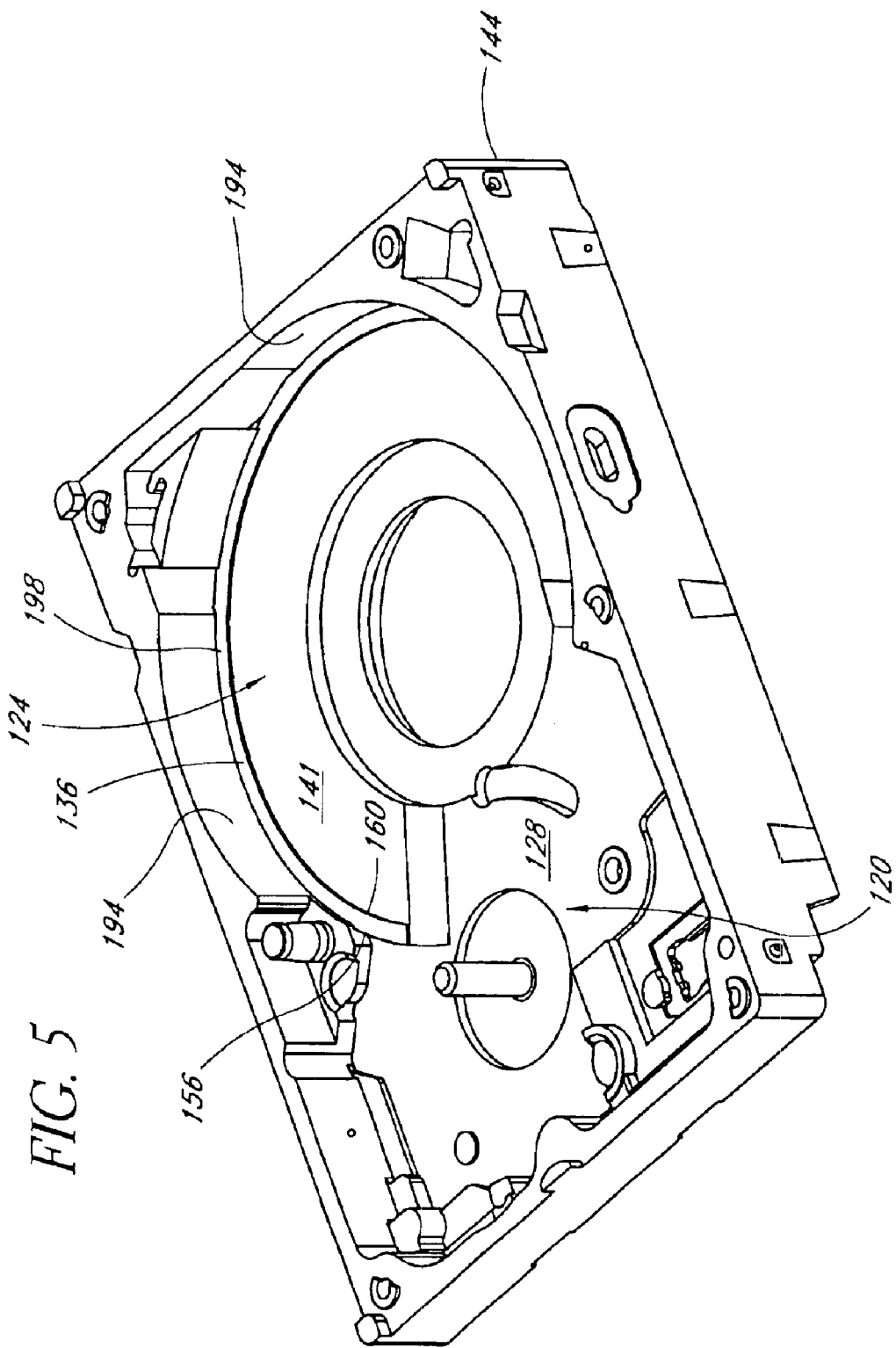
FIG. 5 is a perspective view of another embodiment of a base of a disk drive.
Figure 6:
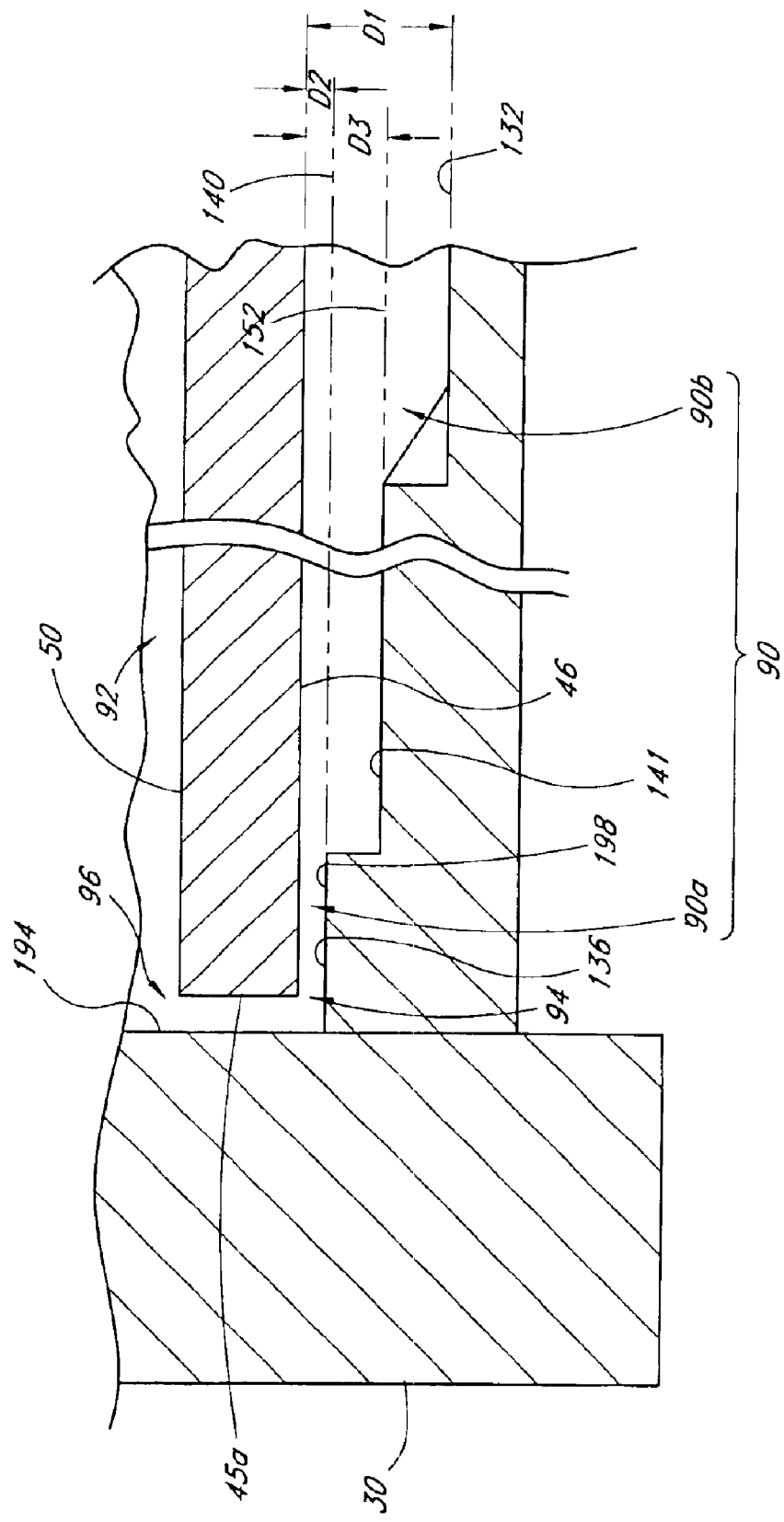
FIG. 6 is an enlarged cross-sectional view similar to that shown in FIG. 3, showing details of the embodiment of the base shown in FIG. 5.

In one embodiment having the third level 141, the second clearance distance D2 is defined between the outer circumferential portion 62 of the first surface 46 of the disk 45a and the arcuate raised portion 136, as in FIGS. 5–6.

Figure 7:
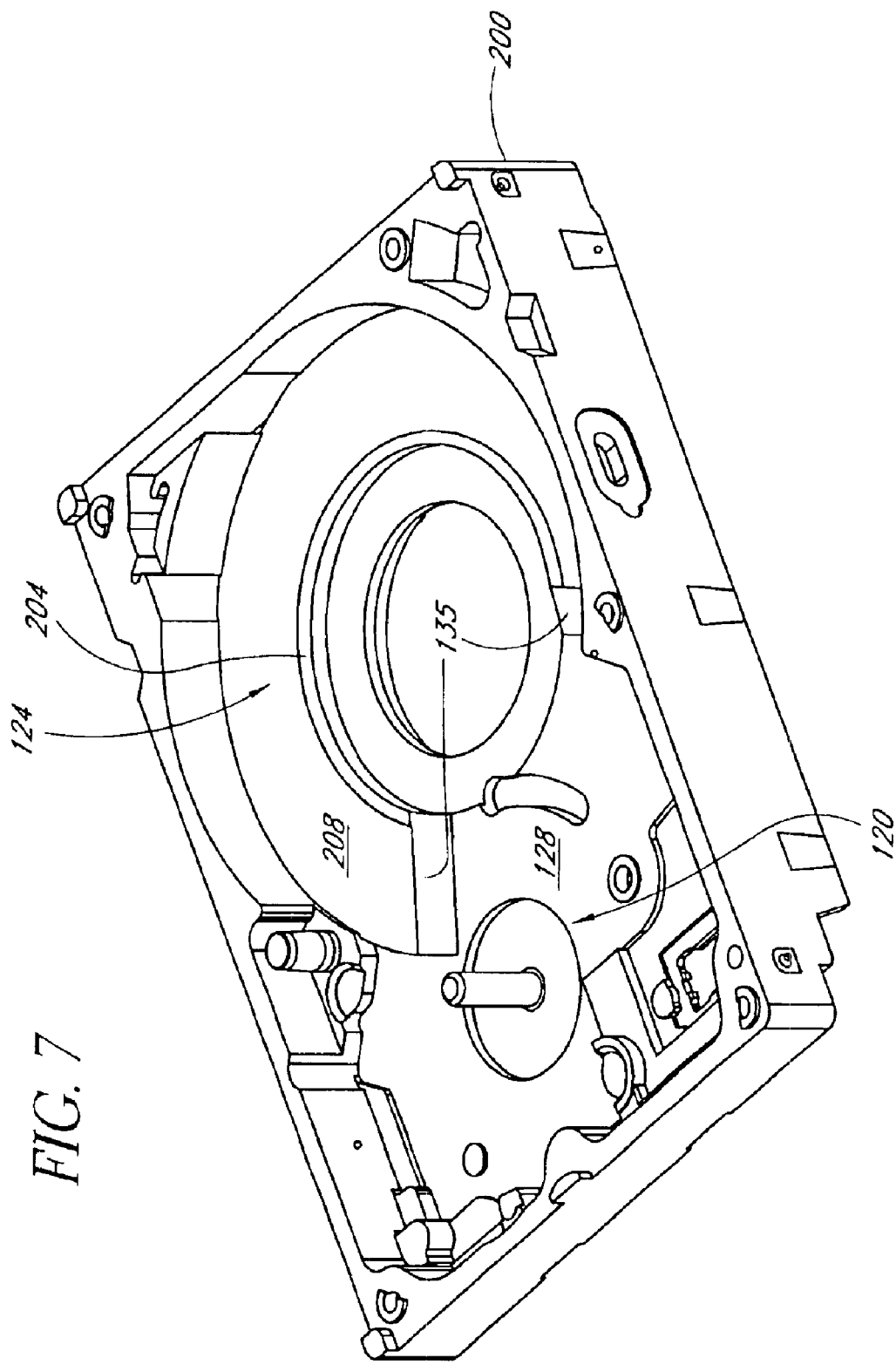
FIG. 7 is a perspective view of another embodiment of a base of a disk drive.
Figure 8:
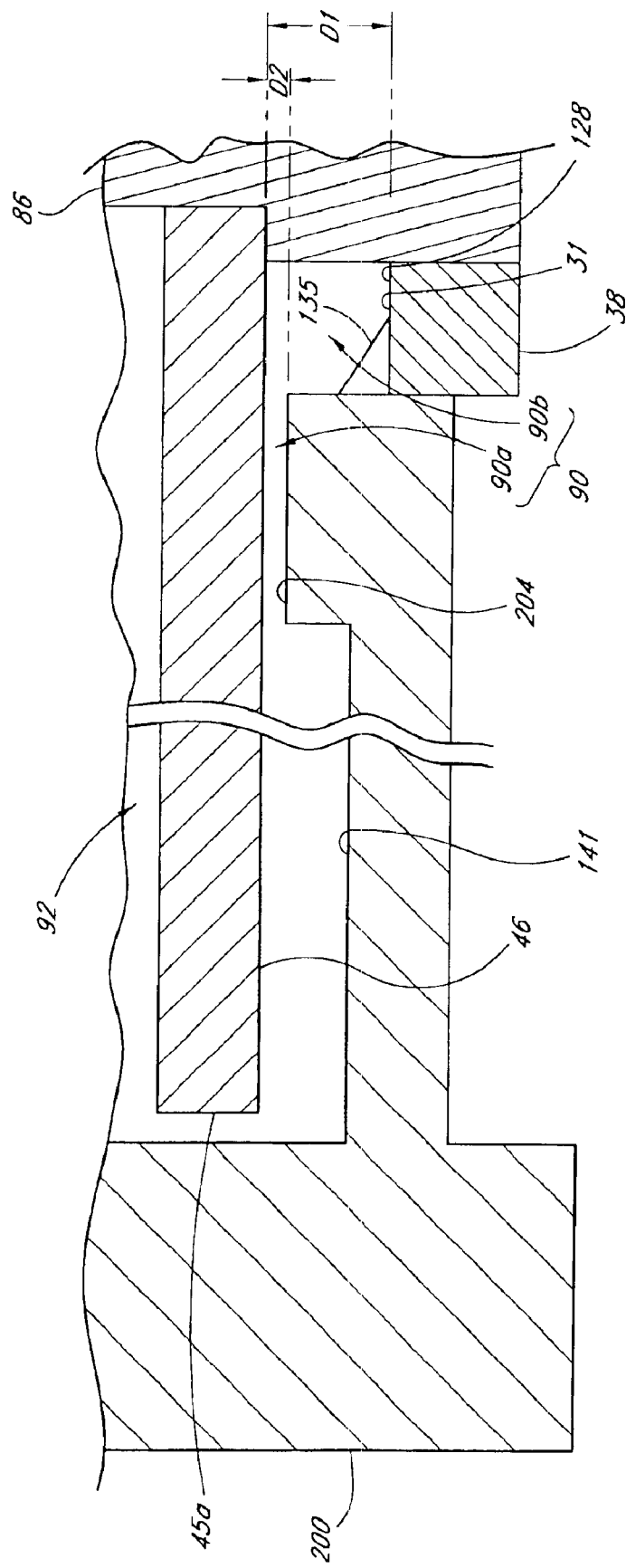
FIG. 8 is an enlarged cross-sectional view similar to that shown in FIG. 3, showing details of the embodiment of the base shown in FIG. 7.

As shown by another embodiment in FIGS. 7 and 8, a base 200 is provided that has the a second level 204 and a third level 208. The second level 204 has the second clearance distance D2. The second clearance distance D2 is defined in a disk drive 10 having the base 200 between the second level 204 and the inner circumferential portion 58 of the first surface 46 of the disk 45a.

In a particular embodiment, in accordance with FIG. 5, having the third level 141, the second level 136 comprises an outer edge 156 and an inner edge 160. In one embodiment, the radial distance between the outer edge 156 and the inner edge 160 is less than about 10 mm. In another embodiment, the radial distance between the outer edge 156 and the inner edge 160 is about 3 mm.

FIGS. 3 and 6 illustrate that one embodiment of the base 30 and one embodiment of the base 144 form an airflow constrictor that reduces disk flutter. Generally, the airflow follows the rotation of the disk 45a as it flows from the second airflow chamber 92 to the first airflow chamber 90. The airflow within the enclosure 22 can be quite unpredictable. As discussed above, the airflow increases the disk flutter of the disks 45. In particular, turbulent airflow can increase the disk flutter of the disks 45 enough to increase TMR to a level that is high enough to limit the track pitch, and consequently to limit the areal density of the disk drive 10.

The airflow constrictor includes a first arcuate portion 194 and a second portion 198. In one embodiment, the first arcuate portion 194 is generally parallel to the hub 86 and is spaced radially outwardly therefrom. In one embodiment, the second portion 198 is generally perpendicular to the first arcuate portion 194 and extends radially inwardly from the first arcuate portion 194 of the airflow constrictor. The second portion 198 of the airflow constrictor is located subjacent at least a portion of the outer circumferential portion 62 of the first surface 46 of the disk 45a. In another embodiment, the second portion 198 of the airflow constrictor is located subjacent only a portion of the outer circumferential portion 62 of the disk 45a. The airflow constrictor limits airflow between the first airflow chamber 90 and the second airflow chamber 92. In particular, in one embodiment, the airflow constrictor is at least partially located in the first airflow chamber inlet 94.

The airflow constrictor reduces the turbulence of the airflow between the second airflow chamber 92 and the first portion 90a of the airflow chamber 90 by reducing the clearance distance between the disk 45a and the various embodiments of the base described herein.

What is claimed is:

1. A disk drive comprising:
   an enclosure having a cover and a base;
   a spindle motor assembly mounted on the enclosure, the spindle motor assembly including a hub that is rotatable with respect to the enclosure;
   a disk mounted on the hub, the disk having a first surface, a second surface, and an outer periphery, the first surface being substantially parallel to a portion of the base located beneath the first surface and radially between the hub of the spindle motor assemble and a projection of the outer periphery, the first surface being spaced apart from the base by a first clearance distance; and
   an arcuate raised portion on the base substantially parallel to the disk and spaced apart from the disk by a second clearance distance that is less than the first clearance distance, at least a portion of the disk superposed over at least a portion of the arcuate raised portion, wherein the arcuate raised portion subtends a central angle of at least about 180 degrees.

2. The disk drive of claim 1, wherein the first surface further comprises an inner circumferential portion and an outer circumferential portion, the second clearance distance being defined between the arcuate raised portion on the base and at least a portion of the outer circumferential portion of the disk.

3. The disk drive of claim 1, wherein the first surface further comprises an inner circumferential portion and an outer circumferential portion, the second clearance distance being defined between the arcuate raised portion on the base and at least a portion of the inner circumferential portion of the disk.

4. The disk drive of claim 1, wherein the second clearance distance is less than 0.05 inches.

5. The disk drive of claim 1, wherein the second clearance distance is between about 0.005 inches and about 0.025 inches.

6. The disk drive of claim 1, wherein second clearance distance is about 0.016 inches.

7. The disk drive of claim 1, wherein the second clearance distance is about 0.01 inches.

8. The disk drive of claim 1, wherein the arcuate raised portion comprises an outer edge and an inner edge, the radial distance between the outer edge and the inner edge being less than about 10 mm.

9. The disk drive of claim 1, wherein the arcuate raised portion comprises an outer edge and an inner edge, the radial distance between the outer edge and the inner edge being about 3 mm.

10. The disk drive of claim 1, wherein the arcuate raised portion subtends a central angle between about 210 degrees and about 270 degrees.

11. The disk drive of claim 1, wherein the arcuate raised portion subtends a central angle of about 360 degrees.

12. The disk drive of claim 1, wherein the arcuate raised portion subtends a central angle of about 270 degrees.

13. The disk drive of claim 1, further comprising a transition portion extending from the arcuate raised portion of the base, the transition portion configured to move airflow in a generally laminar fashion onto or off of the arcuate raised portion.

14. The disk drive of claim 13, wherein the transition portion comprises a linear side profile.

15. A disk drive comprising:
    an enclosure having a cover and a base;
    a spindle motor assembly mounted on the enclosure, the spindle motor assembly including a hub that is rotatable with respect to the enclosure;
    a disk mounted on the hub, the disk having a first surface, a second surface, an inner circumferential portion, an outer circumferential portion, and an outer periphery, the first surface being substantially parallel to a portion of the base located beneath the first surface and radially between the hub of the spindle motor assembly and a projection of the outer periphery, the base and the first surface of the disk defining a first airflow chamber, the second surface of the disk defining a boundary of a second airflow chamber; and
    an airflow constrictor comprising a first arcuate portion and a second portion, the first arcuate portion being generally parallel to the hub and spaced radially outwardly therefrom, the second portion being generally perpendicular to the first arcuate portion and extending radially inwardly from the first arcuate portion of the airflow constrictor, the second portion of the airflow constrictor subjacent only a portion of the outer circumferential portion of the disk and subtending a central angle of at least about 180 degrees, the airflow constrictor limiting airflow between the first airflow chamber and the second airflow chamber.

16. A disk drive comprising:
    an enclosure having a cover and a base;
    a spindle motor assembly mounted on the enclosure, the spindle motor assembly including a hub that is rotatable with respect to the enclosure;
    a disk mounted on the hub, the disk having a first surface, a second surface, and an outer periphery, the first surface being substantially parallel to a portion of the base located beneath the first surface and radially between the hub of the spindle motor assembly and a projection of the outer periphery, the base and the first surface of the disk defining a first airflow chamber having a first airflow chamber inlet, the second surface of the disk defining a boundary of a second airflow chamber having a second airflow chamber inlet; and
    an airflow constrictor subtending a central angle of at least about 180 degrees and having a surface substantially parallel to the first surface of the disk, the airflow constrictor at least partially located in the first airflow chamber inlet, the airflow constrictor limiting airflow between the first airflow chamber and the second airflow chamber.

17. The disk drive of claim 16, wherein the disk further comprises an inner circumferential portion and an outer circumferential portion, the airflow constrictor further comprises a first arcuate portion and a second portion, the first arcuate portion being generally parallel to the hub and spaced radially outwardly therefrom, the second portion of the airflow constrictor being generally perpendicular to the first arcuate portion and extending radially inwardly from the first arcuate portion of the airflow constrictor subjacent only a portion of the outer circumferential portion of the disk, the airflow constrictor proximate at least the outer circumferential portion of the disk.

18. A disk drive comprising:
    an enclosure having a cover and a base, the base comprising:

an actuator arm movement area comprising a first level having a first elevation, and a disk assembly mounting area comprising a second level extending around at least about 180 degrees of the disk assembly mounting area, the second level having a second elevation;

a spindle motor assembly mounted on the enclosure, the spindle motor assembly including a hub that is rotatable with respect to the enclosure;

a disk assembly mounted on the hub in the disk assembly mounting area, the disk assembly comprising a disk having a first surface and an outer periphery;

a first clearance distance defined between the first surface of the disk and the first level of the actuator arm movement area of the base; and a second clearance distance defined between the first surface of the disk and the second level of the disk assembly mounting area of the base, the second clearance distance being less than the first clearance distance, wherein the second level and a portion of the first level located beneath the first surface and radially between the hub of the spindle motor assembly and a projection of the outer periphery are substantially parallel to the first surface.

19. The disk drive of claim 18, wherein the first surface of the disk further comprises an inner circumferential portion and an outer circumferential portion, the disk assembly mounting area further comprises an outer perimeter, an inner portion, and a third level having a third elevation, the third level extending around a portion of the inner portion of the disk assembly mounting area, the second level extending around a portion of the outer perimeter of the disk assembly mounting area, the third level being spaced farther from the disk than the second level.

20. The disk drive of claim 19, wherein the base further comprises a disk shroud, the second level extending from the disk shroud to a location subjacent at least a portion of the outer circumferential portion of the disk.

21. The disk drive of claim 18, wherein the first surface of the disk further comprises an inner circumferential portion and an outer circumferential portion, the disk assembly mounting area further comprises an outer perimeter, an inner portion, and a third level having a third elevation, the third level extending around a portion of the outer perimeter of the disk assembly mounting area, the second level extending around a portion of the inner portion of the disk assembly mounting area, the third level being farther from the disk than the second level.

22. The disk drive of claim 18, wherein the base further comprises a transition portion extending between the second level of the base and the first level of the base, the transition portion configured to move airflow in a generally laminar fashion between the second level and the first level.

23. The disk drive of claim 22, wherein the transition portion comprises a linear side profile.

24. The disk drive of claim 18, wherein the base further comprises a disk shroud, the second level extending from the disk shroud to a location subjacent at least a portion of the outer circumferential portion of the disk.

* * * * *